(12) United States Patent
van Druten et al.

(10) Patent No.: US 9,770,968 B2
(45) Date of Patent: Sep. 26, 2017

(54) FLYWHEEL MODULE

(71) Applicant: DTI Group B.V., Eindhoven (NL)

(72) Inventors: Roëll Marie van Druten, Eindhoven (NL); Bas Gerard Vroemen, Eindhoven (NL); Alexander Franciscus Anita Serrarens, Waalre (NL)

(73) Assignee: DTI Group, B.V., Eindhoven (NL)

( * ) Notice: Subject to any disclaimer, the term of this patent is extended or adjusted under 35 U.S.C. 154(b) by 0 days.

(21) Appl. No.: 14/312,622

(22) Filed: Jun. 23, 2014

(65) Prior Publication Data

US 2014/0298791 A1 Oct. 9, 2014

Related U.S. Application Data

(63) Continuation-in-part of application No. 13/146,262, filed as application No. PCT/NL2010/050039 on Jan. 27, 2010, now abandoned.

(30) Foreign Application Priority Data

Jan. 27, 2009 (NL) ...................................... 2002453

(51) Int. Cl.
*B60K 6/10* (2006.01)
(52) U.S. Cl.
CPC .................... *B60K 6/105* (2013.01)
(58) Field of Classification Search
CPC ................... B60K 6/12; B60K 6/105
USPC .................................................. 475/5, 269
See application file for complete search history.

(56) References Cited

U.S. PATENT DOCUMENTS

| 2003/0098185 | A1 | 5/2003 | Komeda et al. |
| 2005/0217922 | A1 | 10/2005 | Ozsoylu et al. |
| 2007/0219038 | A1 | 9/2007 | Druten et al. |
| 2011/0003660 | A1* | 1/2011 | Grant ............................ 475/116 |
| 2011/0247443 | A1 | 10/2011 | Shimizu et al. |

FOREIGN PATENT DOCUMENTS

| EP | 0043909 | 1/1982 | |
| FR | 2467095 | 4/1981 | |
| JP | 31-074955 | 4/1986 | |
| JP | 2008230378 B1 | 4/2008 | |
| WO | WO2007138353 | 6/2007 | |
| WO | 2008114552 A1 | 9/2008 | |
| WO | 2009010819 | * 1/2009 | ............ B60K 6/365 |
| WO | WO2009010819 | 1/2009 | |

OTHER PUBLICATIONS

Definition of "node" from merriam-webster.com, taken Jun. 29, 2015.*

* cited by examiner

*Primary Examiner* — Stacey Fluhart
(74) *Attorney, Agent, or Firm* — Banner & Witcoff, Ltd.

(57) ABSTRACT

A flywheel module comprises a coupling unit which has an input shaft and an output shaft. This coupling unit has a first coupling of which a first coupling half can be connected to a combustion engine and a second coupling half can be connected to a continuously variable transmission. The flywheel module further comprises a flywheel unit which has an in/output and is formed by a flywheel and a reduction gear unit connected to the flywheel. This flywheel unit is exclusively connected to the in/output via the coupling unit.

8 Claims, 2 Drawing Sheets

FLYWHEEL MODULE

CROSS-REFERENCE TO RELATED APPLICATIONS

The present application is a continuation-in-part of utility patent application Ser. No. 13/146,262, filed Jul. 26, 2011, currently pending, which is a National stage filing claiming priority to application PCT/NL10/50039, filed Jan. 27, 2010. These applications claim priority to Netherlands application 2002453, filed Jan. 27, 2009.

FIELD OF THE INVENTION

The invention relates to a flywheel module to be used in a vehicle provided with a driving source and a transmission, and more particularly to transmissions having hydraulic The flywheel module comprises:
a coupling unit comprising:
  an input shaft, which can be coupled to the driving source, and
  an output shaft, which can be coupled to the transmission,
and comprising a first coupling, which is present between the input shaft and the output shaft and which comprises:
  a first coupling half connected to the input shaft, and
  a second coupling half connected to the output shaft,
as well as
a flywheel unit having an in/output and including:
  i) a flywheel, and
  ii) a reduction gear unit having an input which is connected to the flywheel and an output which is connected to the in/output of the flywheel unit, and comprising:
    a) a reduction gearing as well as
    b) a coupling device which is connected to the reduction gearing.

STATE OF THE ART

A transmission system comprising a flywheel module of this type is known from U.S. Pat. No. 5,569,108. In the known transmission system the flywheel unit is connected with its in/output and furthermore with a further in/output to the coupling unit, while this further in/output is connected to the first coupling half of the first coupling. The reduction gearing in this known flywheel module is formed by a planetary gear set having three rotational members, a first rotational member of which being connected to the flywheel, a second rotational member being connected via a brake to a node positioned between the second coupling half and the output shaft and the third rotational member being connected via a brake to the further in/output. This known flywheel module is relatively complex.

SUMMARY OF THE INVENTION

It is an object of the invention to provide a flywheel module of the type defined in the opening paragraph, which is less complex than the known flywheel module. For this purpose the flywheel module according to the invention is characterised, in that the flywheel unit is connected with its in/output to the coupling unit, this in/output being connected via a node to the second coupling half of the first coupling and/or to the output shaft. The flywheel unit is preferably exclusively connected with its in/output to the coupling unit. Furthermore, preferably the first coupling is closed in non-energized state.

The transmission is preferably a continuously variable transmission and may be a mechanical (pulleys with push belt or chain), a powersplit mechanical, an electrical, or a powersplit electrical continuously variable transmission. The driving source may be a combustion engine or an electromotor.

The flywheel module further preferably comprises a hydraulic pump which is connected to the node. If the continuously variable transmission comprises an input shaft as well as an output shaft and also a pulley on each shaft and an endless flexible transmission element around the pulleys, at least one pulley disc of one of the pulleys being in a position to be moved from and to the other pulley disc of the pulley, the pump can provide piston displacement by means of a piston connected to this pulley, which piston is displaceable in a hydraulic cylinder. The pump can be directly connected to the node, so that the latter automatically rotates in unison with the driving source.

A disadvantage of this is that at a low speed of the driving source the output (flow) of the pump is low. Sometimes rapid switching is to be performed and a high flow is required, for example in case of an emergency stop or a tip shift. This requires the pump to be designed for high flow at low speed. At higher speeds the pump then often produces too much flow and the pump is then actually over-dimensioned, so that it produces more losses than necessary. At low, sub-normal speeds (no high flow) the pump is then over-dimensioned and produces more losses than necessary also in this situation.

An additional disadvantage of this is that if the driving source is switched off, for example in a hybrid application (idle stop, start stop), no pressure is available for enabling the launch of the vehicle.

An embodiment of the flywheel module according to the invention, in which the aforementioned disadvantages do not occur is characterized, in that the flywheel module comprises a hydraulic buffer which is connected to the pump. As a result, the pump may be down-sized (caused to deliver less flow), while under normal working conditions the flow is still sufficient for all its functions to be performed, so that no energy is wasted. In the case where much flow is needed, the accumulator can help out. Besides, the accumulator can produce pressure if the driving source is in the off mode.

The flywheel module further preferably comprises en electromotor which can drive the pump, as well as a freewheel bearing which is positioned between on the one hand the pump plus electromotor and the node on the other. The pump then does not have a direct connection to the node. In consequence, the pump can electrically be brought to a higher speed than the input shaft of the CVT, so that the pump may be down-sized further. The electromotor is operated in start-stop mode in which the hydraulic accumulator is charged.

It should be observed that the pump and accumulator or the pump and accumulator and electromotor and freewheel bearing can also be advantageously applied to a module without a flywheel unit.

BRIEF DESCRIPTION OF THE DRAWINGS

The invention will be further elucidated below in more detail with reference to examples of embodiments of the flywheel module and the transmission system according to the invention and represented in the drawing figures, in which.

DETAILED DESCRIPTION OF THE DRAWINGS

Figure 1:
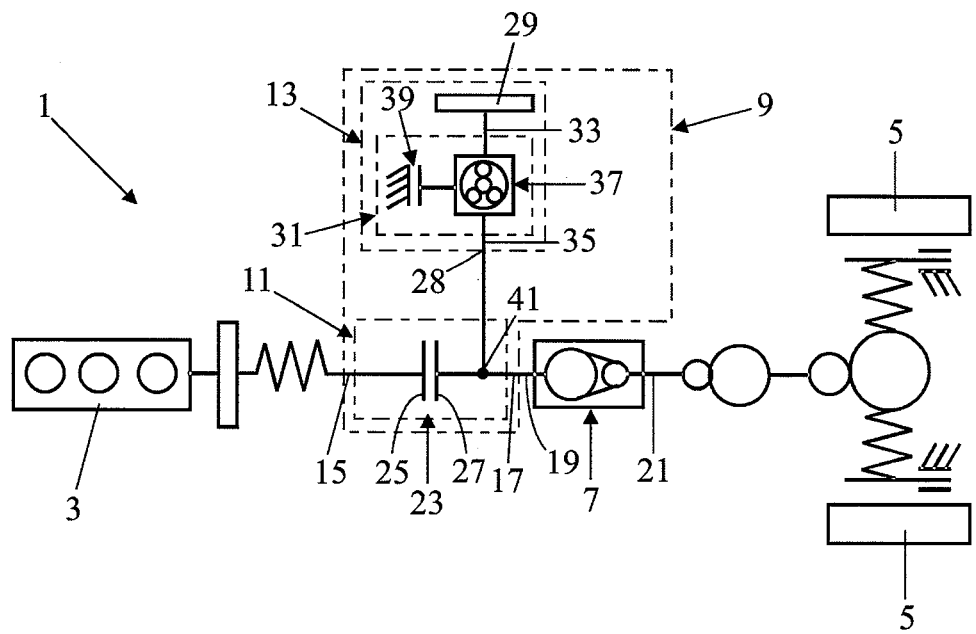
FIG. 1 shows a first embodiment of the flywheel module according to the invention, in which a reduction gear unit is arranged as a planetary gear set and a friction brake.

FIG. 1 shows a first embodiment of a flywheel module 9 according to the invention, in which the reduction gear unit 31 is arranged as a planetary gear set 37 and a friction brake 39. A vehicle 1 has a driving source 3 which is connected to driven wheels 5 via a transmission system. The transmission system comprises a transmission 7 and a flywheel module 9 positioned between the driving source 3 and the transmission 7.

The flywheel module 9 comprises a coupling unit 11 and a flywheel unit 13. The coupling unit comprises an input shaft 15 which is connected to the driving source 3, and an output shaft 17 which is connected to a first in/output 19 of the transmission 7. A second in/output 21 of the transmission 7 is connected to the driven wheels 5. The coupling unit 11 further comprises a first coupling 23 which comprises a first coupling half 25 connected to the input shaft 15, and a second coupling half 27 connected to the output shaft 17.

The flywheel unit 13 comprises an in/output 28 as well as a flywheel 29 and the reduction gear unit 31 which has an input 33 connected to the flywheel 29, and an output 35 which is connected to the in/output 28 of the flywheel unit 13. The reduction gear unit 31 comprises a reduction gearing and a coupling device connected to the reduction gearing. The reduction gearing is in this embodiment is formed by the planetary gear set 37 and the coupling device by the friction brake 39. This planetary gear set 37 comprises three rotational members, a first rotational member of which being connected to the flywheel 29, a second rotational member being connected via a node 41 to the coupling device 11, and the third rotational member being connected to the friction brake 39. The node 41 is a mechanical junction that connects the planetary gear set and the coupling device 11.

Figure 2:
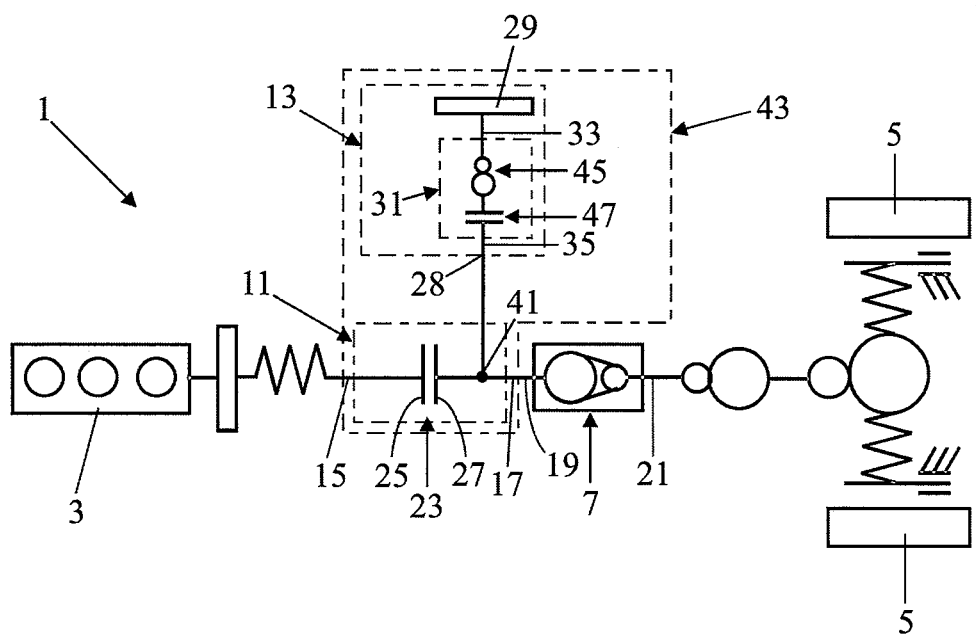
FIG. 2 shows a second embodiment of the flywheel module according to the invention, in which the reduction gear unit is arranged as a gear transmission and a coupling.

FIG. 2 shows a second embodiment of the flywheel module 9 according to the invention, in which the reduction gear unit 31 is arranged as a gear transmission 45 and a coupling 47. All components that are equal to those of the first embodiment shown in FIG. 1 are designated by like reference numerals. This flywheel module 9 differs from the first embodiment in that the reduction gear unit 31 comprises a gear transmission 45 and a coupling 47 which is arranged as a friction coupling. There may even be positioned a third coupling (not shown) between the flywheel 29 and the reduction gear unit 31.

Figure 3:
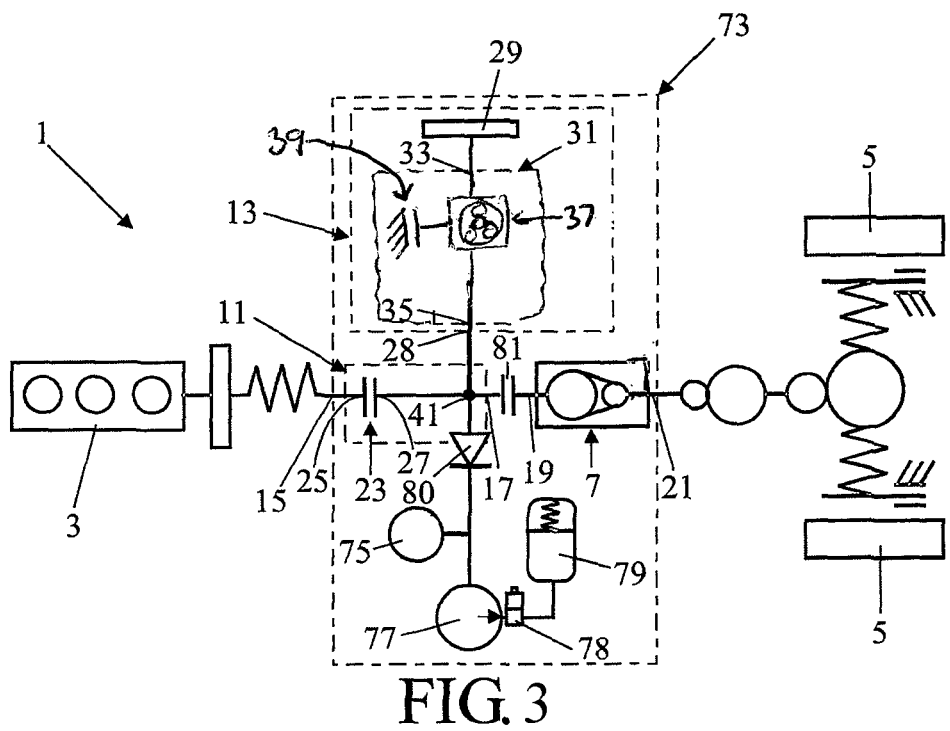
FIG. 3 shows a third embodiment of the flywheel module, similar to that of FIG. 1, but including a hydraulic system.
Figure 4:
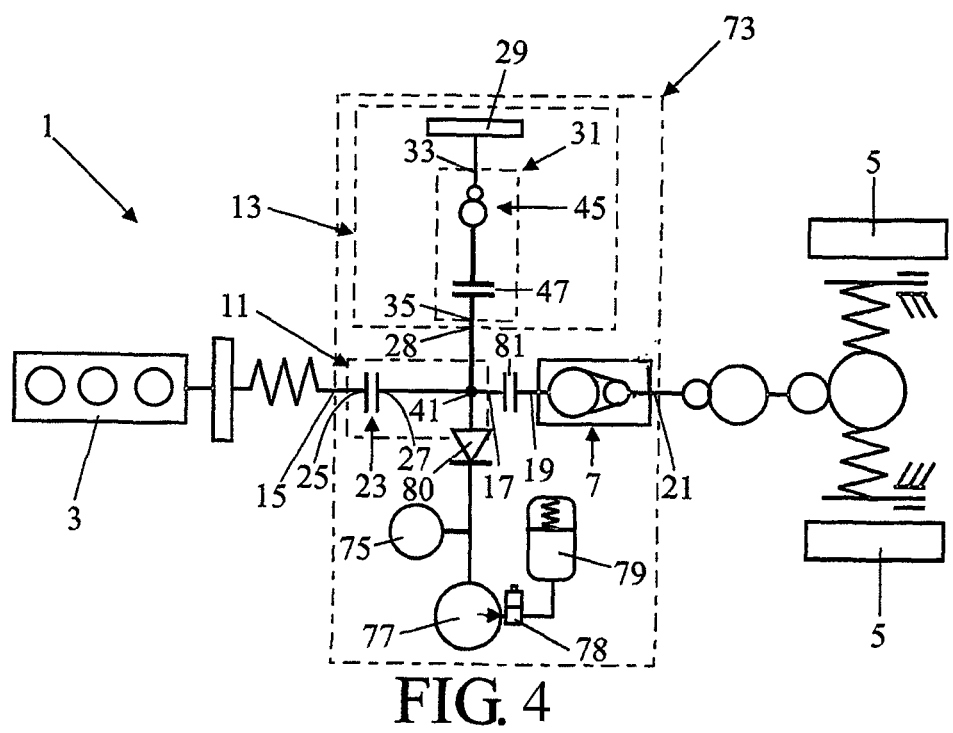
FIG. 4 shows a fourth embodiment of the flywheel module, similar to that of FIG. 2, but including the hydraulic system.

FIG. 3 shows a third embodiment of the flywheel module 9, similar to that of FIG. 1, but including a hydraulic system, discussed below. FIG. 4 shows a fourth embodiment of the flywheel module 9, similar to that of FIG. 2, but including the hydraulic system. All components that are equal to those of the embodiments of FIGS. 1-2 are designated by like reference numerals. In this flywheel module 73 an electrical machine in the form of an electromotor/generator 75 and a hydraulic pump 77 are connected to the node 41 and, furthermore, a hydraulic accumulator 79 is connected to the pump 77. Here too, there is a fifth coupling 81 between the node and the first in/output shaft 19 of the transmission 7. The fifth coupling, however, may also be present in the secondary shaft of the transmission 7. The first coupling 23 is preferably a coupling that is normally closed, which is to say that if this coupling is not operated/energized, it is closed. The second and fifth couplings 47 and 81 are preferably normally open.

In this flywheel module 73 the electromotor 75 is positioned close to the pump 77 and, furthermore, a freewheel bearing 80 is positioned between on the one hand the pump 77 and the electromotor 75 and on the other hand the node 41. Between the pump 77 and the hydraulic accumulator 79 there is a valve 78 for shutting off and releasing the connection between the two. The electromotor 75 can be instrumental in bringing the pump 77 to a higher speed than the input shaft 19 of the transmission 7, so that the pump can be downsized further. The electromotor 75 is operated in the start-stop mode during which the hydraulic accumulator 79 is charged.

Prior to the launch of the vehicle, the coupling 81 is first to be closed and the coupling 23 to be opened. Now the vehicle 1 can be launched using the electromotor 75 while the pressure for operating the couplings 23 and 81 and the transmission 7 is supplied by the hydraulic accumulator 79.

For starting the driving source 3 of the vehicle during driving (coupling 81 closed and coupling 23 open), the coupling 81 is operated in a slipping manner while coupling 23 is open. Subsequently, the coupling 23 is closed while the driving source 3 embodied as a combustion engine is started, after which the coupling 81 is closed completely.

Albeit the invention has been described in the foregoing with reference to the drawing Figures, it should be pointed out that the invention is not by any manner or means restricted to the embodiments shown in the drawing Figures. The invention also extends over any embodiments deviating from the embodiments shown in the drawing Figures within the spirit and scope defined by the claims.

The invention claimed is:

1. A flywheel module to be used in a vehicle provided with a driving source and a transmission, the flywheel module comprising:
   a coupling unit comprising:
      an input shaft which can be coupled to the driving source, and
      an output shaft which can be coupled to the transmission,
      a first coupling which is present between the input shaft and the output shaft and which comprises:
         a first coupling half connected to the input shaft, and
         a second coupling half connected to the output shaft;
   a flywheel unit comprising:
      an in/output connecting the flywheel unit to the coupling unit;
      a flywheel; and
      a reduction gear unit having an input which is connected to the flywheel and an output which is connected to the in/output of the flywheel unit, and further comprising:
         a reduction gearing; and
         a coupling device which is connected to the reduction gearing;

wherein the in/output is connected to the second coupling half of the first coupling;

wherein the first coupling of the flywheel module is arranged such that if it is not energized, it is closed; and wherein the flywheel module further includes a hydraulic pump which is connected to the second coupling half of the first coupling and which provides hydraulic pressure to the transmission.

2. A flywheel module as claimed in claim 1, wherein the flywheel module further includes a hydraulic accumulator which is connected to the pump.

3. A flywheel module as claimed in claim 2, further comprising:

an electromotor which can drive the pump; and a freewheel bearing which is positioned between the hydraulic pump and the second coupling half of the first coupling.

4. A flywheel module as claimed in claim 3, further comprising a valve between the pump and the hydraulic accumulator, for shutting off and releasing the connection between the pump and the hydraulic accumulator.

5. A flywheel module as claimed in claim 1, wherein the reduction gearing is a planetary gear set.

6. A flywheel module as claimed in claim 1, wherein the coupling device is a friction brake.

7. A flywheel module as claimed in claim 1, wherein the reduction gearing is formed by a gear transmission.

8. A flywheel module as claimed in claim 7, wherein the coupling device is connected to the reduction gearing, with the reduction gearing being positioned between the coupling device and the flywheel.

* * * * *